(12) United States Patent
Dürr et al.

(10) Patent No.: US 6,749,180 B2
(45) Date of Patent: Jun. 15, 2004

(54) DIAPHRAGM CARBURETOR FOR AN INTERNAL COMBUSTION ENGINE THAT OPERATES WITH SCAVENGING AIR

(75) Inventors: Bernhard Dürr, Stuttgart (DE); Manfred Rabis, Schorndorf (DE); Werner Geyer, Berglen (DE)

(73) Assignee: Andreas Stihl AG & Co. KG (DE)

( * ) Notice: Subject to any disclaimer, the term of this patent is extended or adjusted under 35 U.S.C. 154(b) by 0 days.

(21) Appl. No.: 10/369,245

(22) Filed: Feb. 14, 2003

(65) Prior Publication Data

US 2003/0160340 A1 Aug. 28, 2003

(30) Foreign Application Priority Data

Feb. 25, 2002 (DE) .......................................... 102 08 051

(51) Int. Cl.$^7$ .............................................. F02M 23/03
(52) U.S. Cl. .......................... 261/23.3; 261/35; 261/46; 261/47; 261/DIG. 1
(58) Field of Search ........................ 261/16, 23.2, 23.3, 261/35, 46, 47, 69.1, DIG. 1, DIG. 68

(56) References Cited

U.S. PATENT DOCUMENTS

| | | | | |
|---|---|---|---|---|
| 1,956,657 A | * | 5/1934 | Scheel ........................ 123/327 |
| 2,751,202 A | * | 6/1956 | Benvenuti .................... 261/47 |
| 2,789,801 A | * | 4/1957 | Durbin ........................ 261/46 |
| 3,205,879 A | * | 9/1965 | Von Seggern et al. ...... 123/581 |
| 3,967,600 A | * | 7/1976 | Iiyama et al. .............. 261/23.2 |
| 4,073,278 A | * | 2/1978 | Glenn .................... 123/198 F |
| 4,083,342 A | * | 4/1978 | Bertling ...................... 123/700 |
| 4,294,205 A | * | 10/1981 | Iiyama et al. .............. 123/274 |
| 4,333,429 A | * | 6/1982 | Iiyama et al. .............. 123/274 |
| 6,328,288 B1 | * | 12/2001 | Gerhardy ..................... 261/35 |
| 6,349,925 B1 | * | 2/2002 | Tobinai et al. ............. 261/23.3 |

FOREIGN PATENT DOCUMENTS

| EP | 1 026 390 | | 8/2000 | |
|---|---|---|---|---|
| JP | 53-81830 | * | 7/1978 | ................ 261/23.3 |
| JP | 57-13257 | * | 1/1982 | ................ 261/23.3 |

* cited by examiner

*Primary Examiner*—Richard L. Chiesa
(74) *Attorney, Agent, or Firm*—R W Becker & Associates; R W Becker

(57) ABSTRACT

A diaphragm carburetor is provided for an internal combustion engine that operates with scavenging air, especially a two-cycle engine in a manually-guided implement. The carburetor has an intake channel portion in which is disposed a butterfly valve that is rotatably held via a shaft and in the vicinity of which fuel-supplying channels open into the intake channel portion. The channels are supplied from a fuel-filled regulating chamber that is formed on a longitudinal side of the intake channel portion in the carburetor housing and is separated by a regulating diaphragm from a compensation chamber. The carburetor has at least one air channel that supplies additional combustion air and that has an air valve that is rotatably held via a shaft. The butterfly valve and the air valve can be brought from a closed position, in which the butterfly valve or the air valve only insignificantly influence the flow in the intake channel portion or in the air channel, into a closed position in which the intake channel portion or the air channel are substantially closed off in an airtight manner, and in an opening direction from the closed position into the opened position. The air valve is coupled to the butterfly valve via a coupling mechanism that compensates for axial and radial tolerances and includes a spring.

20 Claims, 3 Drawing Sheets

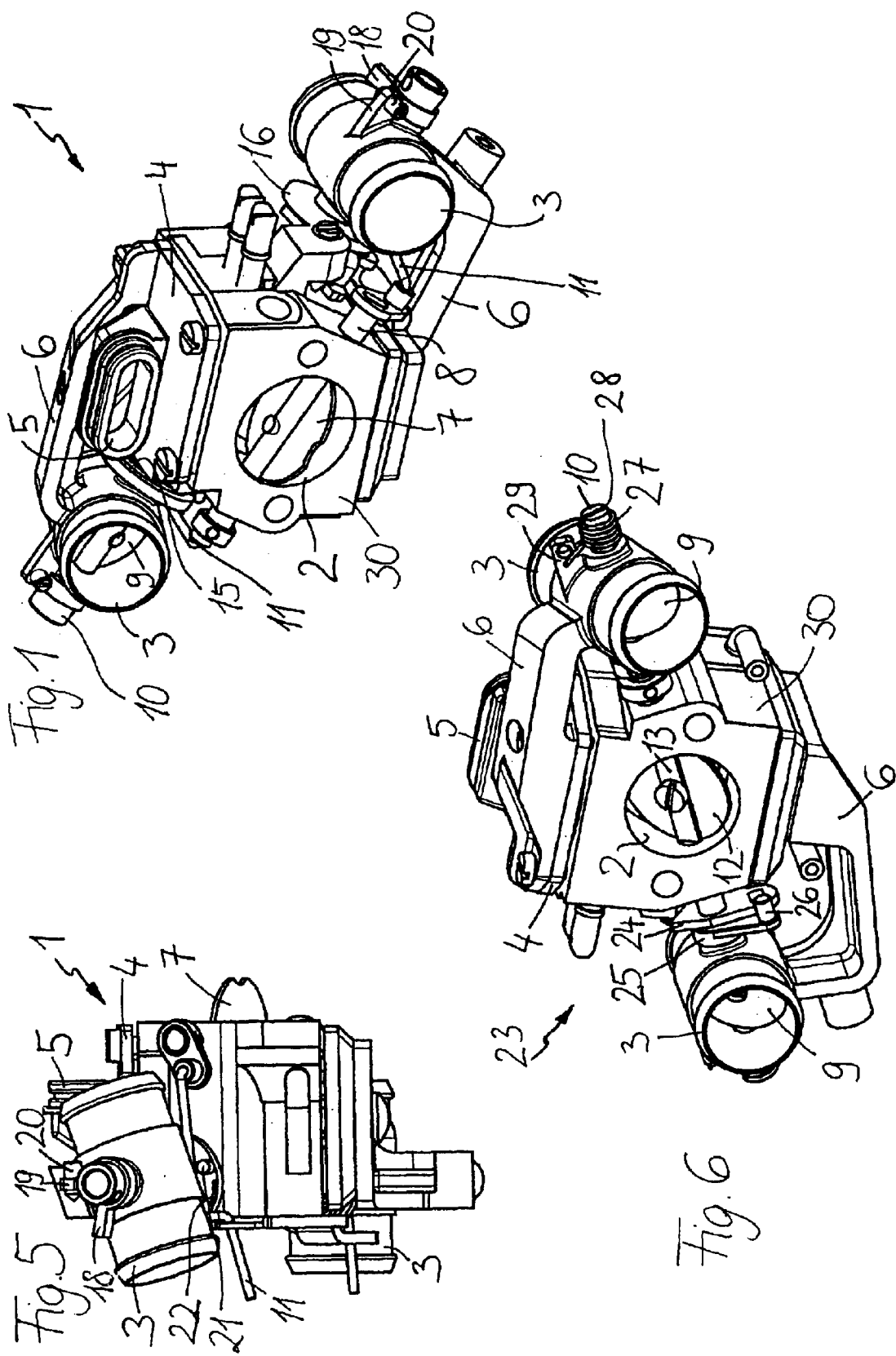

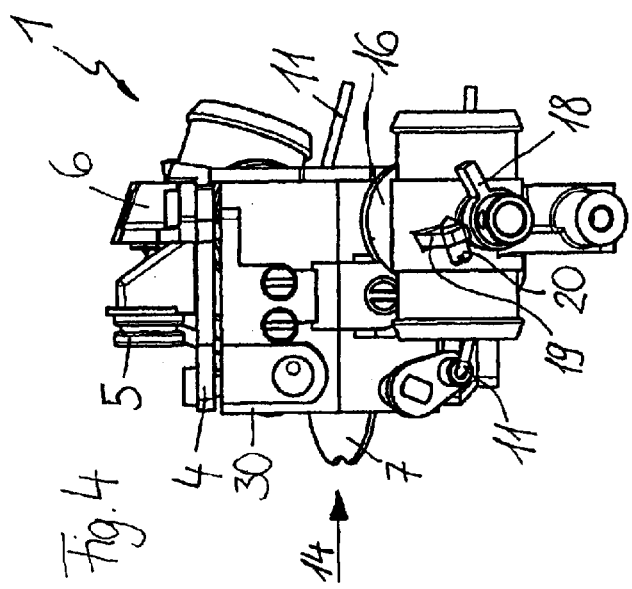
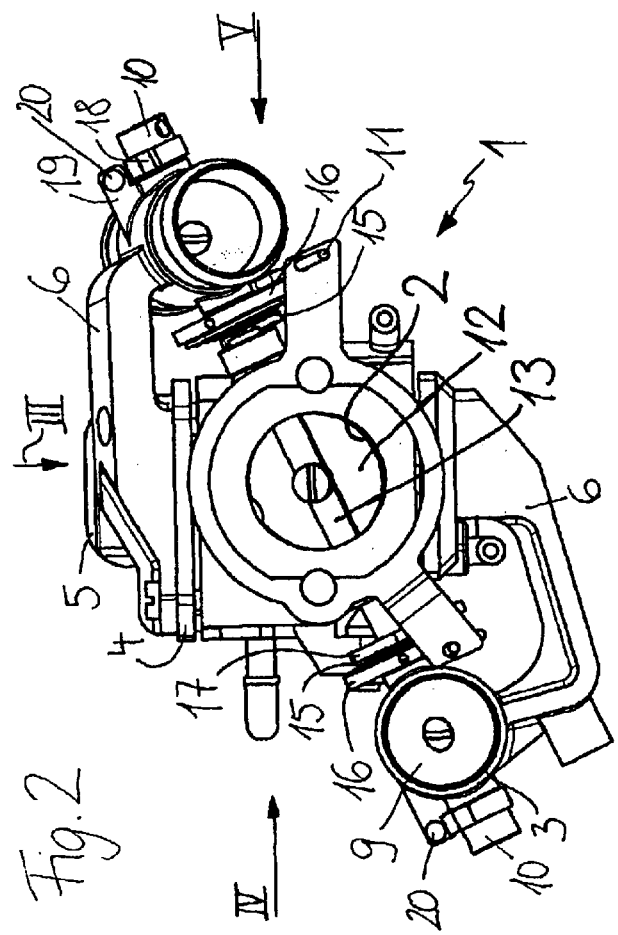
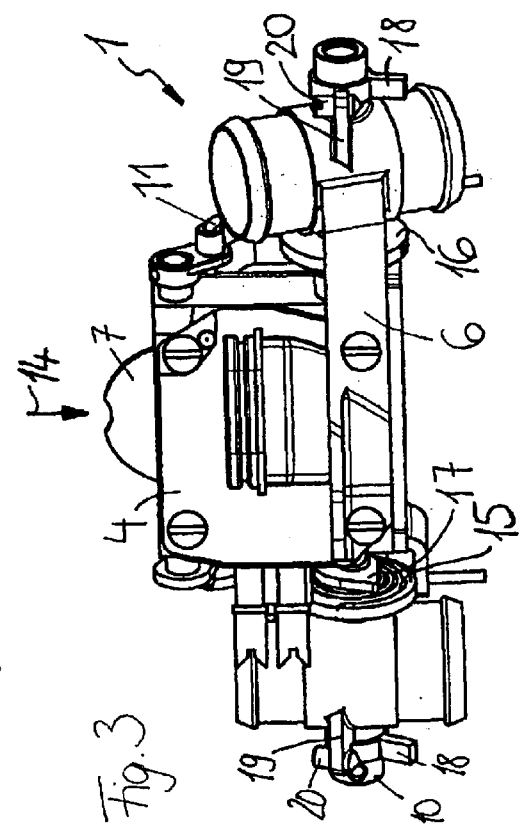

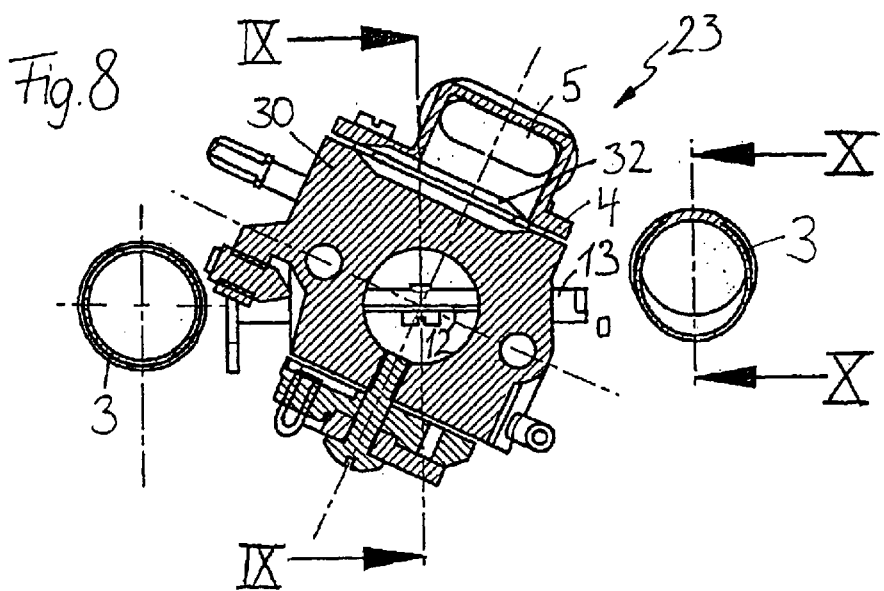
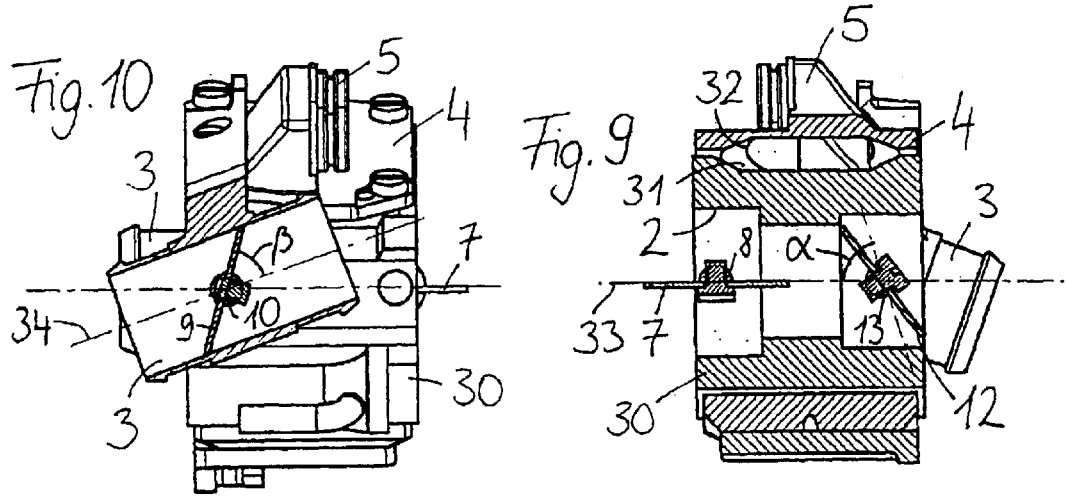
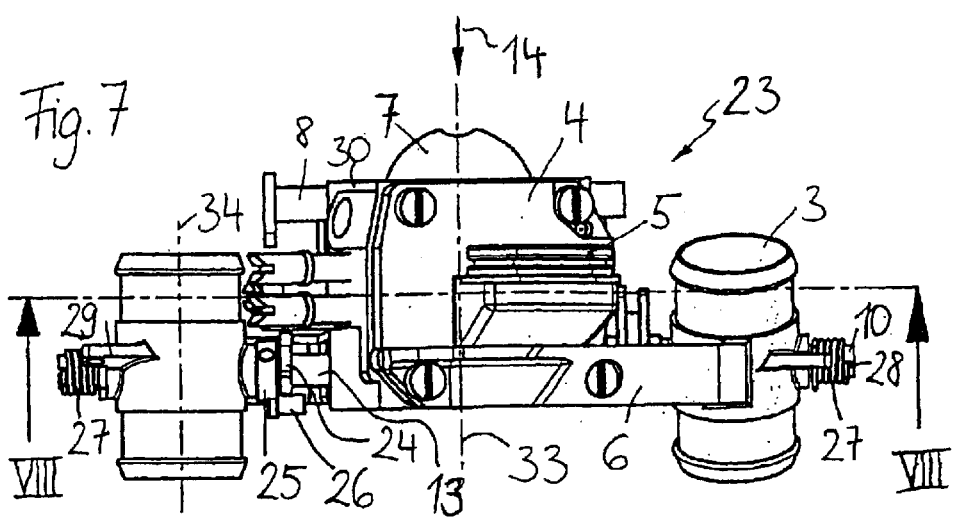

DIAPHRAGM CARBURETOR FOR AN INTERNAL COMBUSTION ENGINE THAT OPERATES WITH SCAVENGING AIR

BACKGROUND OF THE INVENTION

The present invention relates to a diaphragm carburetor for an internal combustion engine that operates with scavenging air, especially for the two-cycle engine in a manually guided implement such as a power chain saw, a cut-off machine, a trimmer, a brush cutter, or the like.

Manually guided implements such as power chain saws, cut-off machines, brush cutters, or the like are provided with a carburetor for producing a fuel/air mixture. For this purpose, fuel nozzles are provided in an intake channel portion of the carburetor that leads to the internal combustion engine; fuel enters the intake channel portion by means of such nozzles. The fuel nozzles, especially a main nozzle and an idling nozzle, are, with regard to their flow volume, measured such that during operation of the internal combustion engine that at least approximates stationary operation, a fuel/air mixture having a prescribed mixture ratio results in the engine. The fuel nozzles are supplied from a fuel-filled regulating chamber that is separated by a diaphragm from a compensation chamber, whereby the compensation chamber communicates with the clean air side of the air filter. The diaphragm regulates the quantity of fuel in the regulating chamber as a function of the air pressure on the clean air side of the air filter, so that the differential pressure between the regulating pressure and the intake channel portion remains constant, and the diaphragm carburetor operates independently of the pressure drop at the air filter.

The air channel or channels supply additional combustion air to the internal combustion engine and open directly into the combustion chamber. The supplied air serves as scavenging air, i.e. it displaces the exhaust gases out of the combustion chamber, separates the fuel/air mixture from the outlet, and simultaneously serves as additional combustion air. The quantity of the air supplied as scavenging air must be coordinated with the fuel/air mixture in the intake channel. For this purpose, the butterfly valve is coupled with the air valve or valves.

EP 1 026 390 A2 discloses a carburetor for a two-cycle engine and has an air channel with an air valve and a separate mixture channel with a butterfly valve, whereby the shaft of the air valve and the shaft of the butterfly valve are interconnected by means of a play coupling. The coupling permits a relative movement of the shafts relative to one another, whereby the magnitude of the angle of the play between the butterfly valve and the air valve is structurally prescribed by fixed abutments.

It is an object of the present invention to provide a diaphragm carburetor of the aforementioned general type that has a construction that is not sensitive to tolerances.

BRIEF DESCRIPTION OF THE DRAWINGS

This object, and other objects and advantages of the present invention, will appear more clearly from the following specification in conjunction with the accompanying schematic drawings, in which:

FIG. 1 is a perspective view of a diaphragm carburetor having an intake channel portion and two air channels disposed on opposite sides of the intake channel portion;

FIG. 2 is a view of the diaphragm carburetor of FIG. 1 counter to the direction of flow in the intake channel portion;

FIG. 3 is a view of the diaphragm carburetor taken in the direction of the arrow III in FIG. 2;

FIG. 4 is a view of the diaphragm carburetor taken in the direction of the arrow IV in FIG. 2;

FIG. 5 is a view of the diaphragm carburetor taken in the direction of the arrow V in FIG. 2;

FIG. 6 is a perspective view of a further exemplary embodiment of an inventive diaphragm carburetor;

FIG. 7 is a view of the diaphragm carburetor of FIG. 6 in conformity with the view of the diaphragm carburetor of FIG. 1 shown in FIG. 3;

FIG. 8 is a cross-sectional illustration of the diaphragm carburetor taken along the line of VIII—VIII in FIG. 7;

FIG. 9 is a cross-sectional illustration of the diaphragm carburetor taken along the line IX—IX in FIG. 8; and FIG. 10 is a cross-sectional illustration of the diaphragm carburetor taken along the line X—X in FIG. 8.

SUMMARY OF THE INVENTION

The diaphragm carburetor of the present invention comprises a carburetor housing, a butterfly valve that, via a butterfly valve shaft, is rotatably held in an intake channel portion of the carburetor housing, whereby fuel-supplying channels open into the intake portion in the vicinity of the butterfly valve, a regulating valve that serves for receiving fuel and is formed in the carburetor housing along a longitudinal side of the intake channel portion, wherein the fuel-supplying channels receive fuel from the regulating chamber, a regulating diaphragm for separating the regulating chamber from a compensation chamber, at least one air channel for supplying additional combustion air, a respective air valve that, via an air valve shaft, is rotatably held in the air channel, whereby the butterfly valve and the air valve, by rotation about their respective shaft, can be brought in a closing direction, from an open position, in which the butterfly valve or air valve only insignificantly influences flow in the intake air portion or the air channel, into a closing position, in which the intake channel portion or the air channel is closed off in a substantially air tight manner, and in an opening direction from the closing position into the open position, and a coupling mechanism for coupling the air valve to the butterfly valve, whereby the coupling mechanism compensates for axial and radial tolerances, and whereby the coupling mechanism includes a spring.

The coupling of the air valve to the butterfly valve via a spring enables the compensation of axial and radial tolerances and of angular offset between the butterfly valve shaft and the air valve shaft.

It is expedient that in the closed position a butterfly valve angle be formed between the butterfly valve and the plane formed by the butterfly valve shaft and the longitudinal axis of the intake channel, and that an air valve angle be formed between the air valve and the plane formed by the air valve shaft and the longitudinal axis of the air channel, whereby the butterfly valve angle is greater than the air valve angle.

In particular in the closed position, the butterfly valve is movable relative to the air valve in the opening direction by an angle, especially by the differential angle between the butterfly valve angle and the air valve angle. Thus, during opening of the butterfly valve the air valve remains in the closed position until the butterfly valve has opened by the angle about which it is movable relative to the air valve. This allows a normal idling operation, and it is prevented that too much additional air is supplied to the internal combustion engine.

In the closing position of the air valve and the butterfly valve, the spring is expediently pre-tensioned in a direction that corresponds to the closing direction of the butterfly valve when the air valve remains stationary, whereby the tensioning angle in particular corresponds to the angular difference between the butterfly valve angle and the air valve angle. Due to the pre-tensioning of the spring, one can adjust beyond which rotational angle of the butterfly valve relative to the air valve the spring is relaxed and hence the air valve follows the opening movement of the butterfly valve.

In the intake channel portion, a choke valve having a choke valve shaft is rotatably held, whereby the choke valve is disposed upstream of the butterfly valve. In particular, the air valve is coupled to the choke valve in the direction of closing. During closing of the choke valve, i.e. during starting of the internal combustion engine, the air valve is closed by the coupling. Furthermore, the air valve is coupled to the butterfly valve in the opening direction via a spring. The opening of the choke valve thus does not influence the position of the air valve.

The air valve is in particular coupled to the butterfly valve in the opening direction via a spring. Thus, for example during closing of the choke valve, the air valve can be closed against the spring independently of the position of the butterfly valve. It can be expedient to couple the air valve to the butterfly valve in the opening direction via engagement or driver means. The driver means can compensate for tolerances between the butterfly valve shaft and the air valve shaft since only in the opening direction do the driver means need to ensure the coupling between the butterfly valve and the air valve. For the closing direction, the air valve can be coupled to the butterfly valve via driver means. However, the air valve can be coupled to the butterfly valve in the closing direction via a spring. The spring ensures the closing of the air valve with the closing movement of the butterfly valve.

In particular, when coupling the air valve to the butterfly valve in the opening direction via a spring, it is expedient that the air valve be coupled to the choke valve in the closing direction via a linkage means. During closing of the choke valve, in particular during cold start of the internal combustion engine, the air valves are thereby closed, as a result of which the proportion of fuel in the fuel/air mixture becomes greater. To compensate for tolerances between the butterfly valve shaft and the air valve shaft, the driver means can be adjustably disposed upon the air valve shaft and/or upon the butterfly valve shaft.

The air valve is provided with an abutment, which is in particular disposed externally of the air channel and fixes the opened position of the air valve. The abutment is in particular adjustable by means of a set screw. As a result, tolerances can be compensated for in the peripheral direction. The spring is expediently disposed between the air valve shaft and the butterfly valve shaft. In particular, the spring is embodied as a coil spring, whereby the air valve shaft is fixed to one end of the coil spring and the butterfly valve is fixed to the other end of the spring, and the position of the ends of the shafts can be varied relative to one another in the peripheral direction. Thus, tolerances in the peripheral direction between the butterfly valve shaft and the air channel shaft can be compensated for, and the pre-tensioning of the spring can be adjusted in the closed position of the butterfly valve and the air valve. However, it can also be expedient to dispose the spring upon the air valve shaft on that side of the air channel that is remote from the intake channel portion, and in particular to embody the spring as a spiral spring. The air valve shaft and the butterfly valve shaft are then coupled in particular via driver means.

Two air channels are expediently disposed on opposite sides of the intake channel portion. However, it would also be possible to provide four air channels. The compensation chamber is formed in the cover of the carburetor housing, and the regulating diaphragm of the carburetor is disposed between the cover and the housing. The cover of the carburetor housing is in particular provided with a channel leading to the clean air side of the air filter, with such a channel being monolithically embodied with the cover. Due to the arrangement of the compensation chamber in the cover, and the monolithic configuration of the channel with the cover, the carburetor has a compact construction and a low number of components.

Further specific features of the present invention will be described in detail subsequently.

DESCRIPTION OF PREFERRED EMBODIMENTS

Referring now to the drawings in detail, FIG. 1 shows a diaphragm carburetor 1, which is provided with an intake channel portion 2 and two air channels 3. The diaphragm carburetor 1 is furthermore provided with a carburetor housing 30 and a cover 4, whereby the cover 4 is monolithically formed with the channel 5, which provides a connection to the clean air side of a non-illustrated filter. Respective mounting means 6 are disposed on the cover 4 and on that side of the diaphragm carburetor 1 that is remote from the cover 4. The mounting means 6 fix the position of the air channels 3 relative to the intake channel portion 2. The air channels 3 can be inclined relative to the intake channel portion 2; however, the longitudinal axis 33 of the intake channel and the longitudinal axes 34 of the air channels (see FIG. 7) must extend in planes that are parallel to one another. A choke or choke valve 7 is rotatably mounted on a shaft 8 in the intake channel portion 2. Respective air valves 9, which are rotatably mounted on shafts 10, are disposed in the air channels 3. The air valves 9 are coupled with the choke valves 7 via linkage means 11. In the opened position of the choke valve 7 illustrated in FIG. 1, the air valves 9 are in a closed position. It can, for example because of space concerns, be expedient to couple the air valves 9 to the choke valve 7 via a gear arrangement.

A butterfly valve 12 is rotatably mounted on a shaft 13 in the intake channel portion (see FIG. 2). The butterfly valve 12 is disposed downstream of the choke valve 7 as viewed in the direction of flow indicated by the arrow 14 in FIG. 3. The shaft 13 of the butterfly valve, and the shafts 10 of the air channels, are respectively interconnected by means of a coil spring 15. The outer end of the coil spring 15, which end is disposed on the periphery of the coil spring, is secured to a disc 16 that is fixed on the shaft 10 of the air valve; the rim of the disc 16 embraces the periphery of the coil spring 15 and fixes the outer end of the coil spring. The other, inner end of the coil spring 15 cooperates with a lever 17 that is fixed on the shaft 13 of the butterfly valve 12. Also secured to the lever 17 can be the gas lever that cooperates with the throttle of the manually guided implement. The coil spring 15 compensates for axial and radial position tolerances, as well as angular offsets between the shaft 13 of the butterfly valve and a shaft 10 of an air valve, and couples the movement of the air valve 9 not only in the direction of opening but also in the direction of closing to the movement of the butterfly valve 12.

To define the opened position of the air valves 9, a respective lever 18 is disposed on that end of the air valve shafts 10 that is remote from the intake channel portion 2;

each lever 18 cooperates with an abutment 19 that is fixed on the pertaining air channel 3. Each abutment 19 is provided with a set screw 20 by means of which the opened position of the respective air valve 9 can be adjusted.

FIGS. 4 and 5 show views of the sides of the diaphragm carburetor 1 on which the air channels 3 are disposed. The air valve shafts 10 are coupled to the choke valve 7, on those sides of the discs 16 that face the air channels 3, via a respective linkage means 11 that cooperates with engagement or driver means 21 that are disposed on the pertaining disc 16. In this connection, the linkage means 11 are embodied such that a closing movement of the choke valve 7 effects a closing movement of the air valves 9 which, however, when the choke valve 7 is opened, can move with the butterfly valve 12 independently of the choke valve 7. In the closed position of the air valves 9, and the closed position of the butterfly valve 12, the coil springs 15 are pre-tensioned, so that the air valves 9 are pressed in a direction of their closed position. In this connection, the pre-tensioning angle is in particular the difference between the butterfly valve angle $\alpha$ and the air valve angle $\beta$, which are illustrated in FIGS. 9 and 10 and will be explained subsequently. Proceeding from its closed position, the butterfly valve 12 is freely movable without that an air valve 9 follows its movement, until the coil springs 15 are relaxed. The position in which the coil springs 15 are relaxed can be varied via openings 22 in the disc 16 in which the end disposed on the periphery of the coil spring 15 is fixed.

FIGS. 6 and 7 show a further diaphragm carburetor 23, whereby the same reference numerals as in FIGS. 1 to 5 designate the same components. Respective engagement or driver means 24 and 25 are disposed between the butterfly valve shaft 13 and the air valve shafts 10, whereby the driver means 24 is disposed on the butterfly valve shaft 13, and the driver means 25 are respectfully disposed on one of the air valve shafts 10. Each driver means 25 is provided with a pin 26 that is axially disposed in the direction of the driver means 24 and rests against the associated driver means 24. In the opening direction, the driver means 25 is taken along by the driver means 24 via the pin 26, so that the air valve shafts 10 and the butterfly valve shaft 13 move in the same direction. In the non-fixed state, the driver means 24 and 25 are rotatably disposed in order to be able to compensate for tolerances in the peripheral direction and to be able to adjust the starting characteristic of the engine. After adjustment has been effected, the driver means 24 and 25 are fixed upon the butterfly valve shaft 13 and the air valve shafts 10 respectively. Axial and radial tolerances can be compensated for, since the pin 26 can rest against the driver means 24 in a variable radial and axial spacing relative to the butterfly valve shaft 13.

Spiral springs 27 are disposed on that side of the air channels 3 that face away from the intake channel portion 2. That end of each spiral spring 27 that is remote from the air channel 3 is fixed in position on the pertaining air valve shaft 10 in a notch 28 on the end face of the shaft. That end of the spiral spring 27 that faces the air channels 3 projects tangentially beyond the outer diameter of the spiral springs 27 and rests respectively against an abutment 29. It can also be advantageous to fix the position of the spiral spring 27 in a bore in the air valve shaft 10. In such a case, the end of the spring 27 projects into the bore or through the bore. The spiral springs 27 are wound in such a way that the air valve shafts 10 are tensioned in the closing direction. As a result, the pins 26 of the driver means 25 come to rest against the driver means 24, as a consequence of which the air valves 9 follow in the closing direction of the movement of the butterfly valve 12. In the closing direction the butterfly valve 12 and the air valve 9 are pressed by the spiral springs 27 into the closing position, so that in particular the air channels 3 are completely closed. The angle about which the butterfly valve 12 is movable relative to the air valves 9 without that the air valves follow their movement, is adjustable via the driver means 24, 25. The angle $\beta$ is already fixed by the shape of the air or butterfly valve 9.

FIG. 8 shows a cross-sectional view through the diaphragm carburetor 23. The cover 4 is screwed or bolted onto the carburetor housing 30, which is monolithically formed with the channel 5. Disposed between the cover 4 and the carburetor housing 30 is a non-illustrated diaphragm that separates the compensation chamber 32, which is disposed on the cover 30 and communicates with the channel 5, from the fuel-filled regulating chamber 31. Fuel-supplying channels lead from the regulating chamber 31 into the intake channel portion 2 and open therein in the region of the butterfly valve 12.

FIG. 9 is a cross-sectional view through the intake channel portion 2, in which the choke valve 7 and the butterfly valve 12 are disposed. In the closed position (illustrated by dashed lines in FIG. 9) the butterfly valve 12 forms the butterfly valve angle $\alpha$ with the plane formed by the butterfly valve shaft 13 and the longitudinal axis 33 of the intake channel.

FIG. 10 is a cross-sectional view through one of the air channels 3. In the closed position, the air valve 9 that is disposed in the air channel 3 forms with the plane formed by the air valve shaft 10 and the longitudinal axis 34 of the air channel the air valve angle $\beta$, whereby the butterfly valve angle $\alpha$ is greater than the air valve angle $\beta$. The spiral spring 27 is arranged in such a way that it is tensioned only when the butterfly valve 12 forms an angle with the plane formed by the butterfly valve shaft 13 and the longitudinal axis 33 of the intake channel that corresponds approximately to the air valve angle $\beta$. As a consequence of the arrangement of the spiral spring 27 and the driver means 24 and 25, the angle after which the air valve 9 follows the movement of the butterfly valve 12 can be adjusted and hence adapted to the starting characteristic of the internal combustion engine.

The driver means 24 and 25 and the spiral springs 27 can also be arranged in the opposite direction of rotation. The air valves 9 are then moved in the opening direction of the spring force of the spiral springs 27 in conformity with the movement of the butterfly valve 12, and in the closing direction are taken along by the driver means 24 and 25. With this arrangement, the air valves 9 can be coupled to the choke valve 7, for example via linkage means 11, so that during closing of the choke valve 7 the air valves 9 are closed against the spiral springs 27.

The specification incorporates by reference the disclosure of German priority document 102 08 051.8 filed Feb. 25, 2002.

The present invention is, of course, in no way restricted to the specific disclosure of the specification and drawings, but also encompasses any modifications within the scope of the appended claims.

We claim:

1. A diaphragm carburetor for an internal combustion engine that operates with scavenging air, comprising:
   a carburetor housing provided with an intake channel portion;
   a butterfly valve that, via a butterfly valve shaft, is rotatably held in said intake channel portion, wherein fuel-supplying channels open into said intake channel portion in the vicinity of said butterfly valve;

a regulating chamber that serves for receiving fuel and is formed in said carburetor housing along a longitudinal side of said intake channel portion, wherein said fuel-supplying channels receive fuel from said regulating chamber;

a regulating diaphragm for separating said regulating chamber from a compensation chamber;

at least one air channel for supplying additional combustion air;

a respective air valve that, via an air valve shaft, is rotatably held in said at least one air channel, wherein said butterfly valve and said air valve, by rotation about their respective shaft, can be brought, in a closing direction, from an open position, in which said butterfly valve or said air valve only insignificantly influences flow in said intake channel portion or said at least one air channel, into a closing position, in which said intake channel portion or said at least one air channel is closed off in a substantially airtight manner, and in an opening direction from said closing position into said open position; and a coupling mechanism for coupling said air valve to said butterfly valve, wherein said coupling mechanism compensates for axial and radial tolerances, and wherein said coupling mechanism includes a spring.

2. A diaphragm carburetor according to claim 1, wherein in said closing position a butterfly valve angle α is formed between said butterfly valve and a plane that is formed by said butterfly valve shaft and a longitudinal axis of said intake channel portion, wherein an air valve angle β is formed between said air valve and a plane formed by said air valve shaft and a longitudinal axis of said at least one air channel, and wherein said butterfly valve angle α is greater than said air valve angle β.

3. A diaphragm carburetor according to claim 2, wherein in said closing position said butterfly valve is movable relative to said air valve in an opening direction about an angle, especially about a differential angle between said butterfly valve angle α and said air valve angle β.

4. A diaphragm carburetor according to claim 2, wherein in a closing position of said air valve and of said butterfly valve, said spring is pre-tensioned in a direction that corresponds to a closing direction of said butterfly valve with said air valve stationary, and wherein a pre-tensioning angle corresponds in particular to an angular difference between said butterfly valve angle α and said air valve angle β.

5. A diaphragm carburetor according to claim 1, wherein a choke valve is rotatably held in said intake channel portion via a choke valve shaft, and wherein said choke valve is disposed upstream of said butterfly valve.

6. A diaphragm carburetor according to claim 5, wherein said air valve is coupled to said choke valve in a closing direction.

7. A diaphragm carburetor according to claim 1, wherein said air valve is coupled to said butterfly valve in an opening direction via a further spring.

8. A diaphragm carburetor according to claim 1, wherein said air valve is coupled to said butterfly valve via driver means.

9. A diaphragm carburetor according to claim 1, wherein said air valve is coupled to said butterfly valve in a closing direction via driver means.

10. A diaphragm carburetor according to claim 1, wherein said air valve is coupled to said butterfly valve in a closing direction via a further spring.

11. A diaphragm carburetor according to claim 5, wherein said air valve is coupled to said choke valve in a closing direction via a linkage means.

12. A diaphragm carburetor according to claim 9, wherein said driver means are adjustably disposed on at least one of said air valve shaft and said butterfly valve shaft.

13. A diaphragm carburetor according to claim 1, wherein said air valve is provided with an abutment that is disposed in particular externally of said at least one air channel, and wherein said abutment fixes an opened position of said air valve.

14. A diaphragm carburetor according to claim 13, wherein said abutment is adjustable, in particular by means of a setscrew.

15. A diaphragm carburetor according to claim 1, wherein said spring of said coupling mechanism is disposed between said air valve shaft and said butterfly valve shaft.

16. A diaphragm carburetor according to claim 15, wherein said spring is embodied as a coil spring, wherein said air valve shaft is fixed to a first end of said coil spring and said butterfly valve shaft is fixed to a second end of said coil spring, and wherein positions of ends of said shaft are variable relative to one another in a peripheral direction.

17. A diaphragm carburetor according to claim 1, wherein said spring of said coupling mechanism is disposed on said air valve shaft on a side of said at least one air channel that is remote from said intake channel portion, and wherein said spring is in particular embodied as a spiral spring.

18. A diaphragm carburetor according to claim 1, wherein two air channels are disposed on opposite sides of said intake channel portion.

19. A diaphragm carburetor according to claim 1, wherein said carburetor housing is provided with a cover, wherein said compensation chamber is formed in said cover, and wherein said regulating diaphragm is disposed between said cover and said carburetor housing.

20. A diaphragm carburetor according to claim 19, wherein said cover of said carburetor housing is provided with a channel for communication with a clean air side of an air filter, and wherein said channel is monolithically formed with said cover.

* * * * *